July 13, 1943.   M. H. BAAL   2,324,350
WIRE WINDING AND UNWINDING ATTACHMENT FOR TRACTOR
Filed Feb. 10, 1941   3 Sheets-Sheet 3
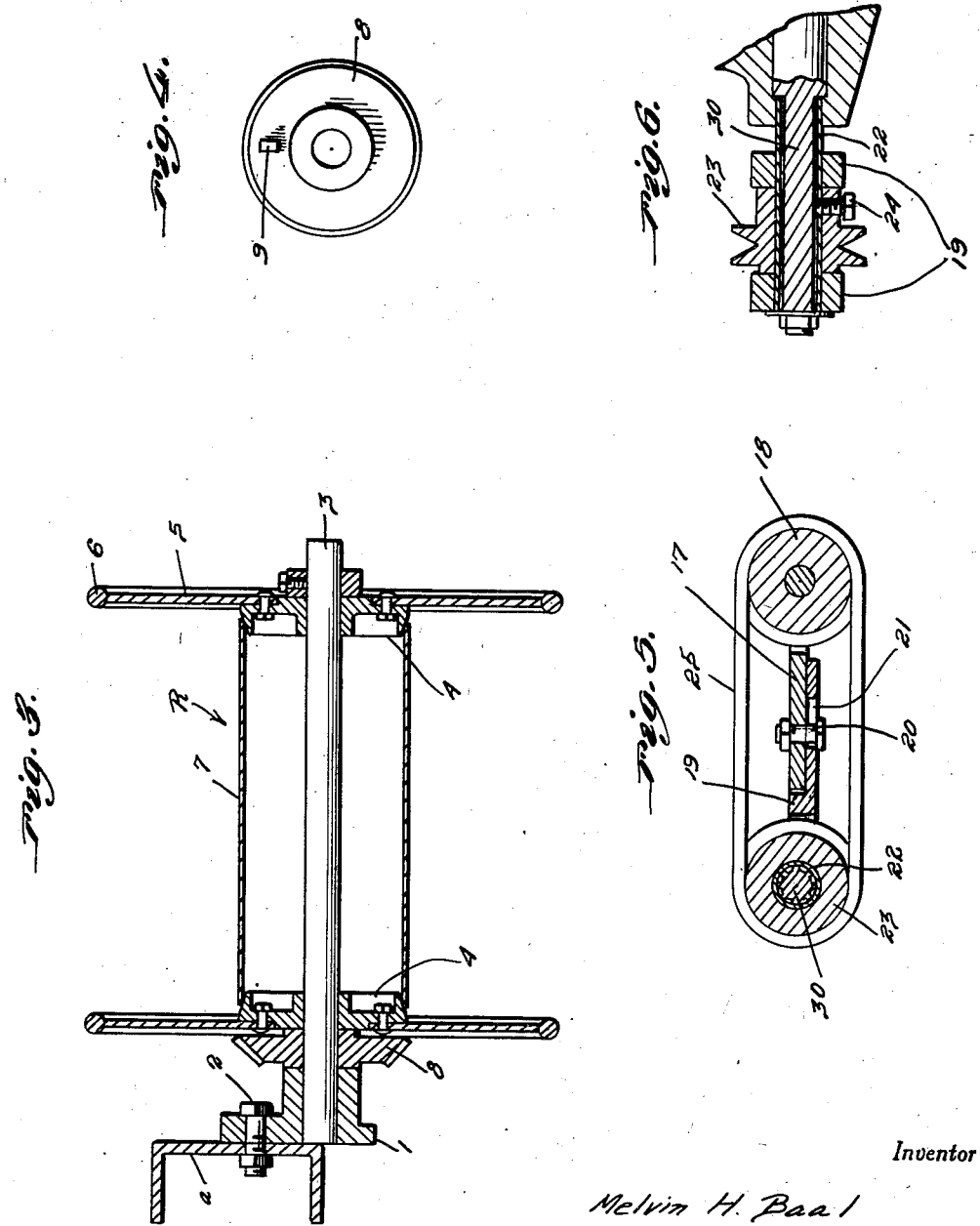
Inventor
Melvin H. Baal
By Clarence A. O'Brien
Attorney Patented July 13, 1943

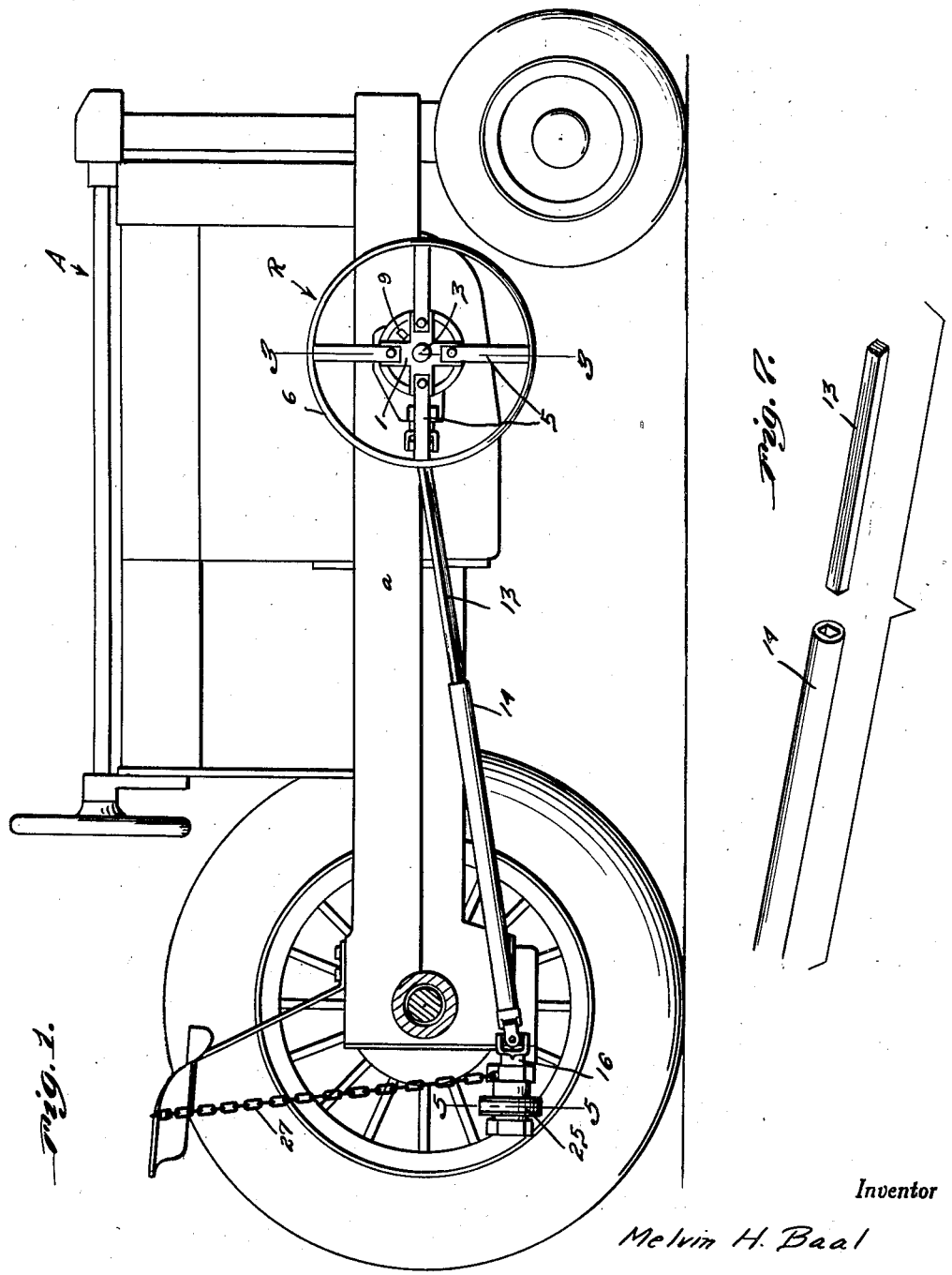

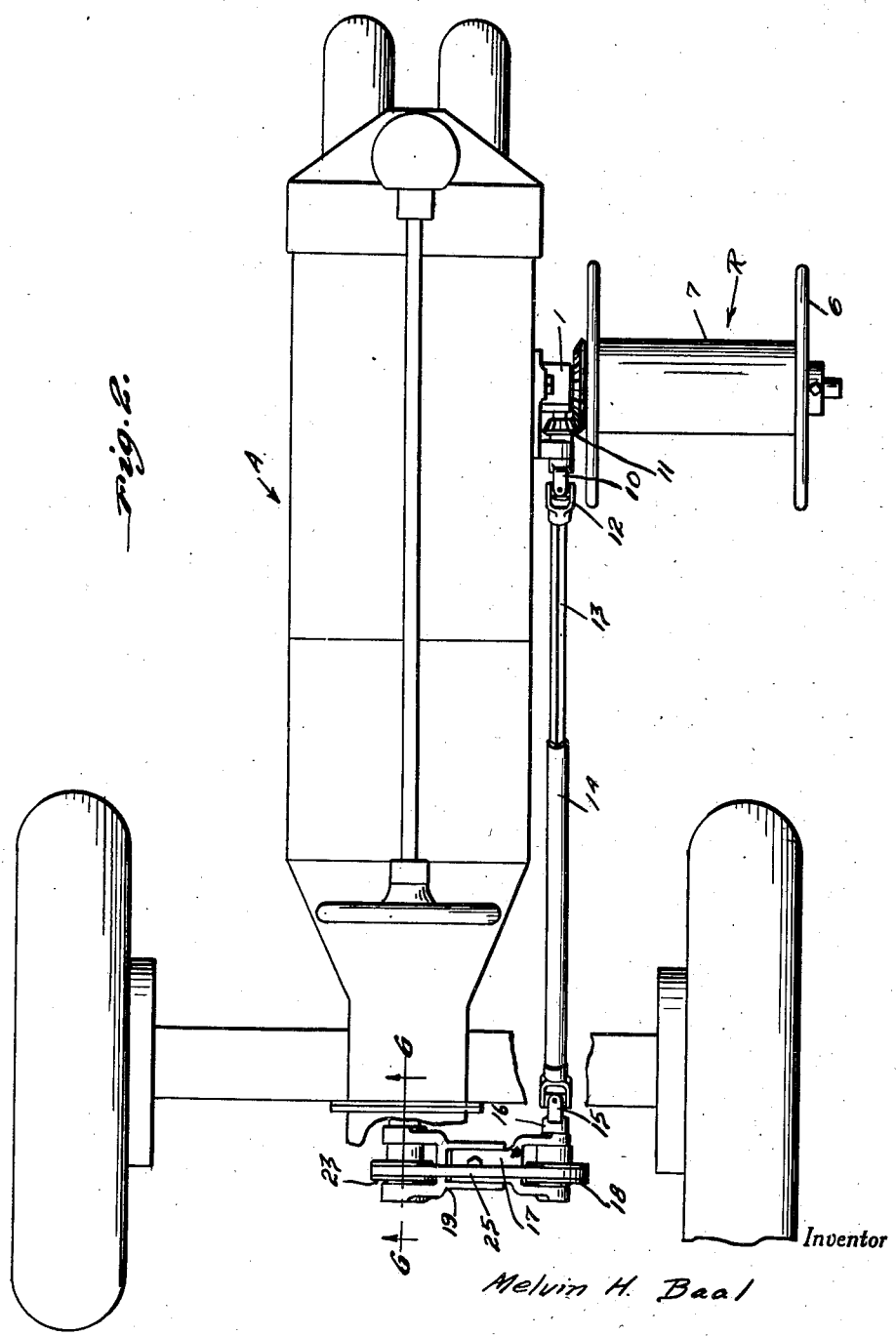

2,324,350

UNITED STATES PATENT OFFICE 2,324,350

WIRE WINDING AND UNWINDING ATTACHMENT FOR TRACTORS

Melvin H. Baal, Ellsworth, Minn.

Application February 10, 1941, Serial No. 378,280

2 Claims. (Cl. 254—166)

This invention relates to an attachment for tractors, the general object of the invention being to provide a reel attached to one side of the tractor and means for rotating the reel from the take-off shaft of the tractor so that barbed wire and the like can be wound upon the reel or unwound therefrom as the tractor travels along.

Another object of the invention is to make the parts adjustable so that the attachment can be attached to various sizes of tractors.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like parts throughout the several views, and in which:

Figure 1 is an elevational view with parts in section showing the invention applied to a tractor.

Figure 2 is a top plan view of Figure 1.

Figure 3 is a section on the line 3—3 of Figure 1.

Figure 4 is a rear view of one of the gear members of the reel.

Figure 5 is a section on the line 5—5 of Figure 1.

Figure 6 is a section on the line 6—6 of Figure 2.

Figure 7 is a view of the telescopic shaft with the parts separated.

In carrying out the invention a bracket 1 is bolted to a side member a of a tractor A as shown at 2 and this bracket carries an outwardly extending horizontal shaft 3 which supports the reel R. This reel is composed of the hub members 4 having the spokes 5 attached thereto, the spokes carrying the rim 6 and a cylinder 7 is supported by the hub members which have tapered circumferences over which fit the ends of the cylinder. A beveled gear 8 is carried by the shaft 3 and a lug 9 on this gear is engaged by parts of the inner hub member so that when the gear is rotated the reel will also be rotated. A stub shaft 10 is rotatably supported in a part of the bracket 1 and carries a beveled pinion 11 which meshes with the gear 8 and a universal joint 12 connects this stub shaft with one end of a non-circular shaft 13 which has a sliding fit in a non-circular socket in a shaft 14 which has its rear end connected by a universal joint 15 with a stub shaft 16 journaled in a forked member 17 and carrying a V-pulley 18. The inner end of this plate 17 has a sliding fit in a channel part of a plate 19 and the two plates are held together in adjusted position by a bolt 20 which passes through a slot 21 in the plate 19. This plate 19 is also of forked construction with its prongs fitting over a sleeve 22 which is adapted to be placed on the take-off shaft 30 at the rear end of the tractor. A V-pulley 23 is placed on the sleeve between the prongs of plate 19, and as a set screw 24 passes through a threaded hole in the hub of the pulley 23 and through a hole in the sleeve with its inner end engaging the space between two of the splines of the power take-off shaft. Thus the pulley 23 is firmly attached to the power take-off shaft so as to rotate therewith.

A chain 27 supports the outer end of the plate 17 from the seat of the tractor as shown in Figure 1 and by adjusting the plate 17 on the plate 19 by means of the bolt 20 the tension of the belt 25 which passes over the two pulleys 18 and 23 can be regulated so that the telescopic shafts 13 and 14 are driven from the take-off shaft to impart movement to the reel so that the reel will properly wrap the wire thereabout.

Thus by attaching one end of the wire to be wrapped to the reel, after the wire has been released from a row of posts, etc. and then starting up the tractor the wire will be wrapped on the reel.

When it is desired to place barbed wire or the like along a fence line, the roll of wire to be laid is placed on the reel and the shift of the take off shaft is placed in neutral position. One end of the wire is attached to a post or some other solid object and then the tractor is started up so that a pull is exerted upon the wire which causes the reel to rotate to unwind the wire and this rotary movement of the reel imparts movement to the rotating parts of the device and the take-off shaft and thus the wire is held under a certain amount of tension so that it needs very little stretching, if any, to make it tight enough to put on a fence.

As will be seen from Figure 3, the outer end member of the reel is removably held in place by the collar bolted to the outer end of the shaft so that by removing the outer end of the reel a roll of wire can be placed on the drum 7 after which the other end member fits back in place.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. An attachment for a tractor comprising a take-off shaft extending from its rear end, a sleeve fitting over the take-off shaft and having a hole therein, a pulley on the sleeve, a bolt passing through the pulley and through the hole and engaging the take-off shaft, a member having a fork at one end, the prongs of which have bearing openings therein through which the sleeve passes with the pulley arranged between the prongs, a second member having prongs at one end thereof, a stub shaft journaled in the prongs of the second member, a pulley carried by the stub shaft, a belt passing over the pulleys, means for adjusting the second member longitudinally on the first member to tension the belt, a bracket connected to a side part of the tractor, an outwardly extending horizontally arranged shaft carried by the bracket, a reel rotatably arranged on the shaft, a bevel gear rotatably arranged on the shaft for driving the reel, a second stub shaft rotatably supported by the bracket, a bevel pinion on the front end of the second stub shaft engaging with the gear, a telescoping shaft and universal joints connecting the ends of the telescoping shaft with the stub shafts.

2. An attachment for a tractor comprising a take-off shaft extending from its rear end, a sleeve fitting over the take-off shaft and having a hole therein, a pulley on the sleeve, a bolt passing through the pulley and through the hole and engaging the take-off shaft, a member having a fork at one end, the prongs of which have bearing openings therein through which the sleeve passes with the pulley arranged between the prongs, a second member having prongs at one end thereof, a stub shaft journaled in the prongs of the second member, a pulley carried by the stub shaft, a belt passing over the pulley, means for adjusting the second member longitudinally of the first member to tension the belt, a rotatably mounted reel on one side of the tractor, and operating connections between the stub shaft and the reel comprising a pair of bevel gears one connected to the reel, a telescopic shaft, and means connecting opposite ends of said shaft to said stub shaft and to the other bevel gear, respectively, comprising a pair of universal joints.

MELVIN H. BAAL.